(12) United States Patent
Mizutani et al.

(10) Patent No.: US 8,496,883 B2
(45) Date of Patent: Jul. 30, 2013

(54) HONEYCOMB FILTER

(75) Inventors: Takashi Mizutani, Tokoname (JP); Koji Nagata, Nagoya (JP); Yukio Miyairi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 13/292,827

(22) Filed: Nov. 9, 2011

(65) Prior Publication Data

US 2012/0058019 A1    Mar. 8, 2012

Related U.S. Application Data

(63) Continuation of application No. PCT/JP2011/058078, filed on Mar. 30, 2011.

(30) Foreign Application Priority Data

Mar. 31, 2010   (JP) .................................. 2010-081900

(51) Int. Cl.
*B01D 50/00* (2006.01)

(52) U.S. Cl.
USPC .......................................... 422/180; 422/178

(58) Field of Classification Search
USPC .............................. 422/168, 177, 180; 55/523
See application file for complete search history.

(56) References Cited

U.S. PATENT DOCUMENTS

| | | | | |
|---|---|---|---|---|
| 4,519,820 A | * | 5/1985 | Oyobe et al. ..................... 55/284 |
| 4,857,089 A | * | 8/1989 | Kitagawa et al. ................ 55/523 |
| 5,089,237 A | * | 2/1992 | Schuster et al. ............. 422/180 |
| 5,519,993 A | * | 5/1996 | Rao et al. ........................ 60/288 |
| 6,508,852 B1 | * | 1/2003 | Thompson et al. ............. 55/523 |
| 7,097,817 B2 | * | 8/2006 | Brisley et al. .............. 423/245.3 |
| 7,107,763 B2 | * | 9/2006 | Suwabe et al. .................. 60/295 |
| 7,718,143 B2 | | 5/2010 | Ogura |
| 7,772,151 B2 | * | 8/2010 | Li et al. .......................... 502/339 |
| 8,216,521 B2 | * | 7/2012 | Li et al. .......................... 422/177 |
| 8,246,922 B2 | * | 8/2012 | Boorse et al. ............. 423/213.2 |
| 8,343,431 B2 | * | 1/2013 | Tokuda et al. ................ 422/180 |
| 2004/0254073 A1 | * | 12/2004 | Wei et al. .................. 502/527.12 |
| 2005/0102987 A1 | * | 5/2005 | Kudo .............................. 55/523 |
| 2006/0057046 A1 | * | 3/2006 | Punke et al. .............. 423/215.5 |
| 2007/0196248 A1 | * | 8/2007 | Mizutani ....................... 422/180 |
| 2007/0234694 A1 | * | 10/2007 | Miyairi et al. .................. 55/523 |
| 2007/0238256 A1 | * | 10/2007 | Fischer et al. ................ 438/303 |
| 2009/0274867 A1 | | 11/2009 | Hiramatsu |
| 2010/0061900 A1 | | 3/2010 | Watanabe et al. |
| 2010/0135866 A1 | | 6/2010 | Mizuno et al. |

FOREIGN PATENT DOCUMENTS

| | | |
|---|---|---|
| JP | 01-304022 A1 | 12/1989 |
| JP | 06-033734 A1 | 2/1994 |

(Continued)

*Primary Examiner* — Tom Duong
(74) *Attorney, Agent, or Firm* — Burr & Brown

(57) ABSTRACT

A honeycomb filter includes a cell having one open end and another closed end that serves as a fluid flow path and a cell having one closed end and another open end, wherein the cells are alternately disposed. The honeycomb filter includes an undeposited region in an upstream region of a partition portion, which has no trapping layer and has a length of 5% or more and 30% or less of the length of the inlet cell. The upstream region of the partition portion includes an undeposited region having an area of 10% or more of that of the cell in a cross-section perpendicular to the exhaust gas flow direction. The undeposited region with no trapping layer in the upstream region decreases the permeation resistance of the partition portion in the upstream region and facilitates fluid passage through the partition portion in the upstream region.

6 Claims, 9 Drawing Sheets

FOREIGN PATENT DOCUMENTS

| | | | |
|---|---|---|---|
| JP | 2001190916 A * | 7/2001 | |
| JP | 2002-188435 A1 | 7/2002 | |
| JP | 2003-154223 A1 | 5/2003 | |
| JP | 2004-216226 A1 | 8/2004 | |
| JP | 2008-253961 A1 | 10/2008 | |
| WO | 2008/078799 A1 | 7/2008 | |
| WO | 2008/136232 A1 | 11/2008 | |

* cited by examiner

HONEYCOMB FILTER

BACKGROUND OF THE INVENTION

1. Field of the Invention

The present invention relates to a honeycomb filter.

2. Description of Related Art

One proposed honeycomb filter includes a porous partition portion, in which a cell that is open at one end and closed at the other end and a cell that is closed at one end and open at the other end are alternately disposed, and a layer for trapping and removing particulate matter (hereinafter also referred to as PM) contained in an exhaust gas formed on the partition portion (see, for example, Patent Documents 1 to 3). This honeycomb filter can trap PM by the trapping layer with low pressure loss.

In another proposed honeycomb filter, a trapping layer formed on a partition portion has a decreased thickness in the central region of the honeycomb filter in the exhaust gas flow direction (see, for example, Patent Document 4). In this honeycomb filter, the permeation resistance of a partition in the central region, which generally has low exhaust gas permeability, can be decreased to increase the exhaust gas permeability, thereby increasing the amount of PM deposit in the central region. This can decrease the temperature rise in the downstream region while PM is removed by combustion.

[Patent Document 1] Japanese Unexamined Patent Application Publication No. 2004-216226

[Patent Document 2] Japanese Unexamined Patent Application Publication No. 6-33734

[Patent Document 3] Japanese Unexamined Patent Application Publication No. 1-304022

[Patent Document 4] WO 2008/136232

SUMMARY OF THE INVENTION

Such a honeycomb filter sometimes contain a catalyst for promoting the combustion of unburned gases in a partition portion. In such a case, the temperature of the honeycomb filter may be increased to remove unburned gases. In another case, the temperature of the honeycomb filter may be increased to remove trapped PM by combustion. In the honeycomb filters according to Patent Documents 1 to 3, a trapping layer formed on the partition can improve the PM trapping efficiency. However, this increases the permeation resistance of the partition and accordingly increases the exhaust gas flow to the downstream region. Thus, it is difficult to increase the temperature of the entire honeycomb filter. In accordance with Patent Document 4, an exhaust gas tends to flow through the central region, and accordingly the temperature rise in the downstream region can be decreased. However, since the trapping layer in the upstream region has a large thickness, a larger amount of exhaust gas flows to the downstream region because of the Venturi effect, for example, under high flow rate conditions. Thus, it is desirable to improve the temperature rise performance of a honeycomb filter.

In view of the situations described above, it is a principal object of the present invention to provide a honeycomb filter that has improved temperature rise performance.

In order to achieve the principal object, the present invention has employed the following means.

In the present invention, a honeycomb filter for trapping and removing solid components contained in a fluid includes; a plurality of porous partition portions each forming a cell, the cell being open at one end and closed at the other end and serving as a flow path of the fluid; and a trapping layer for trapping and removing the solid components contained in the fluid, the trapping layer being disposed on each of the partition portions and containing particle groups having an average particle size smaller than the average pore size of the partition portions, wherein an upstream region of each of the partition portions includes an undeposited region having no trapping layer, the undeposited region having a length of 5% or more and 30% or less of the length of an inlet cell, which is the cell on the inlet side.

This honeycomb filter has improved temperature rise performance. The reason for this is assumed to be as described below. For example, the upstream region of the partition portion includes an undeposited region having no trapping layer. The undeposited region has a length of 5% or more and 30% or less of the length of the inlet cell. The undeposited region having no trapping layer in the upstream region decreases the permeation resistance of the partition portion in the upstream region and facilitates the passage of a fluid through the partition portion in the upstream region. This facilitates the propagation of heat in the partition portion in the upstream region to the downstream region, thus easily increasing the temperature of the entire honeycomb filter. An undeposited region length of 5% or more of the inlet cell length results in a sufficient fluid flow through the partition portion in the upstream region. An undeposited region length of 30% or less of the inlet cell length results in a sufficient amount of trapping layer and a greater effect of the trapping layer in the reduction of pressure loss. The phrase "(undeposited region) length of . . . of the inlet cell length", as used herein, refers to, assuming inlet cells extending between one end of the inlet cell, that is, an inlet end face of the honeycomb filter and the other end of the inlet cell, that is, a sealing portion at the outlet end to be a "line", a value calculated by dividing the integrated length of undeposited regions by the integrated length of inlet cells and multiplying the quotient by 100. The "length of undeposited region" is calculated by integrating the length of each undeposited region in which a trapping layer is not formed in the inlet cells.

In a honeycomb filter according to an aspect of the present invention, the undeposited region in the upstream region of each of the partition portions may have an area of 10% or more of the area of the cell in a cross section perpendicular to flow direction of the fluid. When the undeposited region has an area of 10% or more of the area of the cell, a fluid can easily flow in the upstream region because of low permeation resistance, allowing a larger amount of solid components to be trapped in the partition portion. Furthermore, a heated fluid can also easily pass through the partition portion. Heat generated by the combustion of the solid components is propagated to the downstream region, thus improving the temperature rise performance of the honeycomb filter.

In a honeycomb filter according to an aspect of the present invention, the trapping layer may be formed by supplying an inorganic material that is a raw material for the trapping layer to the cell using a gas as a transport medium. Thus, transportation with a gas can be utilized to relatively easily control the thickness of the trapping layer.

In a honeycomb filter according to an aspect of the present invention, the partition portion may contain one or more inorganic materials selected from cordierite, SiC, mullite, aluminum titanate, alumina, silicon nitride, sialon, zirconium phosphate, zirconia, titania, and silica. The trapping layer may contain one or more inorganic materials selected from cordierite, SiC, mullite, aluminum titanate, alumina, silicon nitride, sialon, zirconium phosphate, zirconia, titania, and silica.

A honeycomb filter according to an aspect of the present invention may be formed by joining two or more honeycomb segments with a bonding layer. Each of the honeycomb segments has the partition portion and the trapping layer.

In a honeycomb filter according to an aspect of the present invention, at least one of the partition portion and the trapping layer may be loaded with a catalyst. The catalyst can facilitate the removal of components contained in a fluid, such as the removal of trapped solid components by combustion. The catalyst may burn unburned carbon-containing components contained in the fluid. This can further purify the fluid.

DETAILED DESCRIPTION OF THE INVENTION

Figure 1:
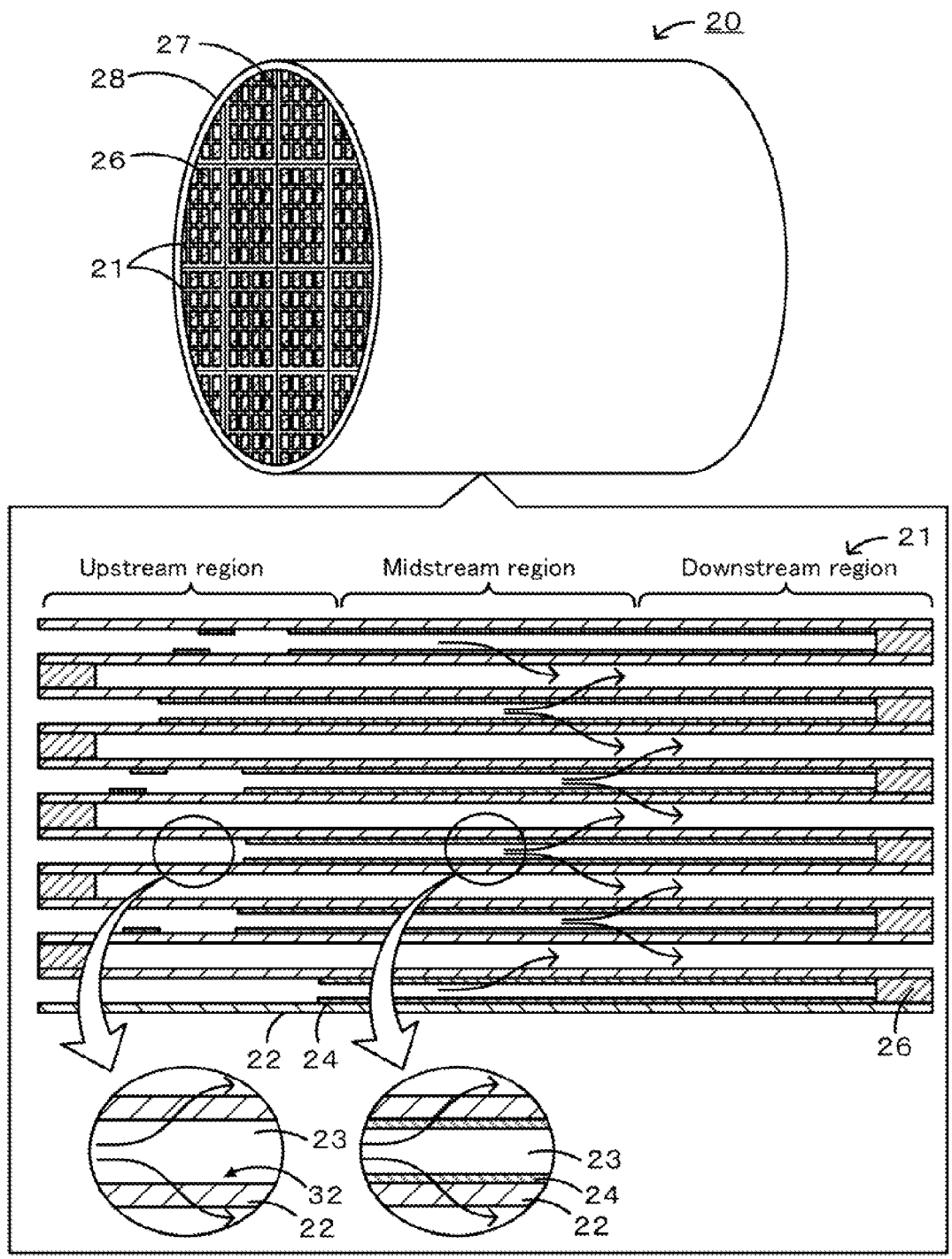
FIG. 1 is an explanatory view of the structure of a honeycomb filter 20.
Figure 2:
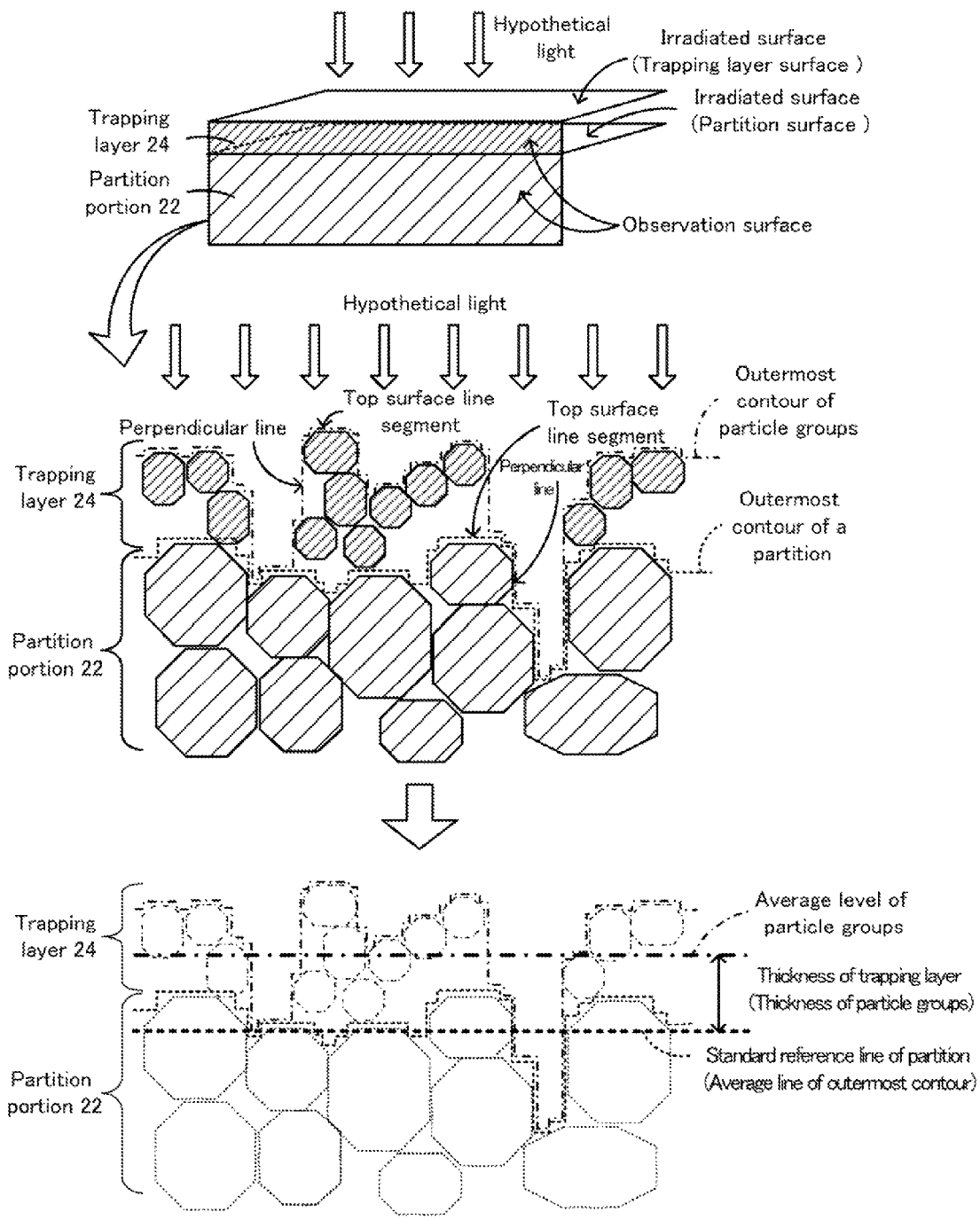
FIG. 2 is an explanatory view of a method for calculating the thickness of a trapping layer on the basis of SEM observation.
Figure 3:
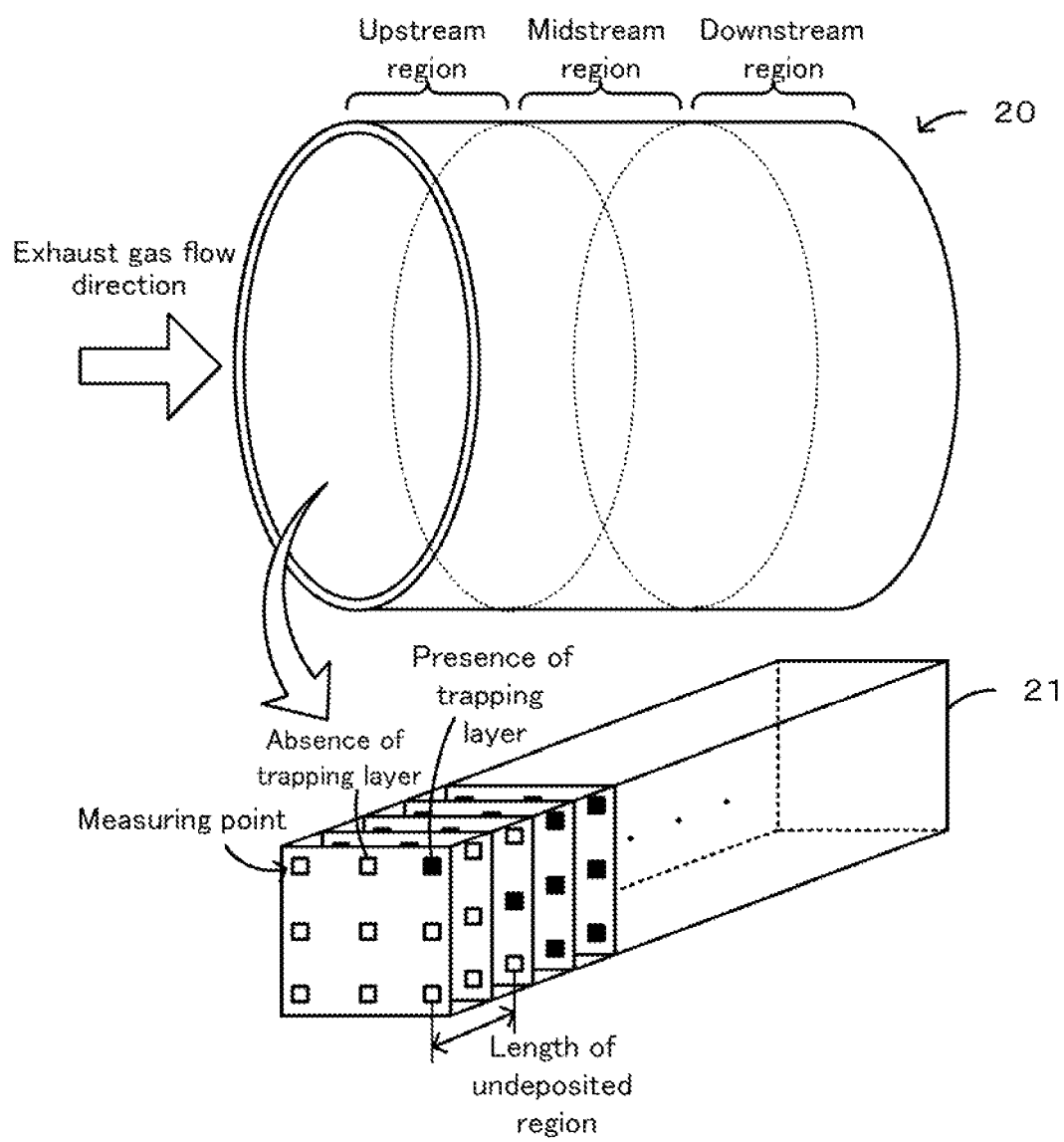
FIG. 3 is an explanatory view of measuring points at which the thickness of a trapping layer 24 is measured.

A honeycomb filter according to one embodiment of the present invention will be described below with reference to the accompanying drawings. FIG. 1 is an explanatory view of the structure of a honeycomb filter 20 according to an embodiment of the present invention. FIG. 2 is an explanatory view of a method for calculating the thickness of a trapping layer on the basis of SEM observation. FIG. 3 is an explanatory view of measuring points at which the thickness of a trapping layer 24 is measured. As illustrated in FIG. 1, the honeycomb filter 20 according to the present embodiment includes two or more honeycomb segments 21 joined together with a bonding layer 27 and an outer protective portion 28 around the honeycomb segments 21. Each of the honeycomb segments 21 includes a partition portion 22. In FIG. 1, the honeycomb filter 20 is cylindrical, each of the honeycomb segments 21 is rectangular columnar, and a cell 23 is rectangular. The honeycomb filter 20 includes a partition portion 22 constituting each of a plurality of cells 23, each of the cells being open at one end and sealed with a sealing portion 26 at the other end and serving as an exhaust gas flow path, and a trapping layer 24 for trapping and removing solid components (also referred to as PM) contained in an exhaust gas. The trapping layer 24 is formed of particle groups having an average particle size smaller than the average pore size of the partition portion 22 and is disposed on the partition portion 22. In the honeycomb filter 20, the partition portion 22 is formed such that a cell 23 that is open at one end and closed at the other end and a cell 23 that is closed at one end and open at the other end are alternately disposed. In the honeycomb filter 20, the trapping layer 24 is formed on the inner wall of the cell 23 on the side of an inlet for an exhaust gas fluid. In the honeycomb filter 20, an exhaust gas enters an inlet cell 23, passes through the trapping layer 24 and the partition portion 22, and is exhausted from an outlet cell 23, during which PM in the exhaust gas is trapped on the trapping layer 24. The average particle size of the particle groups constituting the trapping layer 24 is a mean value measured by observing the trapping layer 24 with a scanning electron microscope (SEM) and measuring the individual particles of the trapping layer 24 in the images obtained. The average size of raw material particles is the median size (D50) measured with a laser diffraction/scattering particle size distribution analyzer using water as a dispersion medium.

In the honeycomb filter 20, the partition portion 22 may have a partition thickness $t_p$ of 150 μm or more and 460 μm or less. A partition thickness $t_p$ of 150 μm or more results in a large heat capacity of the filter and a high regeneration limit. The regeneration limit is the permissible amount of PM deposit during the regeneration treatment of the honeycomb filter 20. A partition thickness $t_p$ of 460 μm or less results in low permeation resistance of the partition, preventing the increase in pressure loss. More specifically, the regeneration limit refers to the amount of PM deposit at which the maximum internal temperature of the honeycomb filter reaches a predetermined permissive temperature (for example, 1000° C.) while the PM deposit is removed by combustion (during the regeneration treatment). The partition thickness $t_p$ is preferably 200 μm or more and 400 μm or less, more preferably 280 μm or more and 350 μm or less. The partition portion 22 is porous and may contain one or more inorganic materials selected from cordierite, Si-bonded SiC, recrystallized SiC, aluminum titanate, mullite, silicon nitride, sialon, zirconium phosphate, zirconia, titania, alumina, and silica. Among these, cordierite, Si-bonded SiC, and recrystallized SiC are preferred. The partition portion 22 preferably has a porosity of 30% by volume or more and 85% by volume or less, more preferably 35% by volume or more and 65% by volume or less. The partition portion 22 preferably has an average pore size of 10 μm or more and 60 μm or less. The porosity and the average pore size of the partition portion 22 are measured by a mercury intrusion method. The partition portion 22 having such a porosity, an average pore size, and a thickness allows an exhaust gas to easily pass through the partition portion 22 and PM to be easily trapped and removed.

In a trapping-layer-formed region of the honeycomb filter 20 in which the trapping layer 24 is formed, the particle groups constituting the trapping layer 24 preferably have an average thickness of 5 μm or more and 80 μm or less. At an average thickness of 5 μm or more, PM can be properly trapped by the trapping layer 24, and high trapping efficiency can be achieved at an initial state in the absence of PM deposition. At an average thickness of 80 μm or less, a PM deposit layer is not excessively thick, the trapping layer does not have large permeation resistance, and the increase in pressure loss can be reduced. The average thickness is preferably 20 μm or more and 60 μm or less, more preferably 30 μm or more and 50 μm or less. The trapping layer 24 formed of particle groups made of an inorganic material may be formed as a uniform layer or a partial layer on the partition portion 22.

The honeycomb filter 20 includes an undeposited region 32 in the upstream region of the partition portion 22. The undeposited region 32 has no trapping layer 24 and has a length of 5% or more and 30% or less of the length of the inlet cell. The undeposited region 32 having no trapping layer 24 in the upstream region decreases the permeation resistance of the partition portion 22 in the upstream region and facilitates the passage of a heated exhaust gas through the partition portion 22 in the upstream region. This facilitates the propagation of heat in the partition portion 22 in the upstream region to the downstream region, thus increasing the temperature of the entire honeycomb filter 20. An undeposited region length of 5% or more of the inlet cell length results in a sufficient exhaust gas flow through the partition portion 22 in the upstream region. An undeposited region length of 30% or less of the inlet cell length results in a sufficient amount of the trapping layer 24 and a greater effect of the trapping layer in the reduction of pressure loss. The phrase "length of . . . of the inlet cell length", as used herein, refers to, assuming inlet cells extending between one end of the inlet cell, that is, an inlet end face of the honeycomb filter and the other end of the inlet cell, that is, a sealing portion at the outlet end to be a "line", a value calculated by dividing the integrated length of undeposited regions 32 by the integrated length of inlet cells and multiplying the quotient by 100. The "lengths of the undeposited regions" are calculated by integrating the lengths of undeposited regions in which a trapping layer is not formed in the inlet cells. The "regions in which a trapping layer is not formed" may be regions in which no trapping layer is formed.

The upstream region of the partition portion 22 of the honeycomb filter 20 may include an undeposited region 32 having an area of 10% or more of the area of the cell 23 in the cross section perpendicular to the exhaust gas flow direction. When the undeposited region 32 has an area of 10% or more of the area of the cell 23, an exhaust gas can easily flow through the partition portion 22 in the upstream region because of low permeation resistance, allowing a larger amount of PM to be trapped in the partition portion 22. Furthermore, a heated exhaust gas can easily pass through the partition portion. Heat generated by the combustion of PM is propagated to the downstream region, thus improving the temperature rise performance of the honeycomb filter. The undeposited region 32 more preferably has an area of 30% or more of the area of the cell 23. This can more significantly improve the rate of temperature rise and, for example, improve the capacity to remove unburned gas components (hydrocarbons (HCs), CO, and the like) or the capacity to remove trapped PM by combustion. The undeposited region 32 at any location in the cross section can propagate the heat of combustion. The undeposited region 32 in the vicinity of the center of gravity can efficiently propagate the heat of combustion.

The thickness of the trapping layer 24, and the upstream, midstream, and downstream regions of the honeycomb filter 20 will be described below. First, a method for measuring the thickness of the trapping layer 24 will be described below with reference to FIG. 2. The thickness of the trapping layer 24, in other words, the thickness of the particle groups constituting the trapping layer is determined in the following manner. The thickness of the trapping layer is determined by embedding a partition substrate of the honeycomb filter 20 in a resin and polishing the resin to prepare a sample for observation, performing scanning electron microscope (SEM) observation, and analyzing the images obtained. First, the sample for observation is prepared by cutting and polishing such that a cross section perpendicular to the fluid flow direction serves as an observation surface. The observation surface of the sample for observation prepared is photographed at measuring points described below in a visual field of approximately 500 μm×500 μm at a SEM magnification in the range of 100 to 500. The outermost contour of a partition is then hypothetically drawn on the images obtained. The outermost contour of a partition is a line showing the outline of the partition and refers to a projector obtained by irradiating a partition surface (a surface to be irradiated; see the top in FIG. 2) with hypothetical parallel light in the direction perpendicular to the partition surface (see the middle in FIG. 2). The outermost contour of a partition is composed of line segments corresponding to a plurality of top surfaces of the partition at different levels irradiated with hypothetical light and perpendicular lines each connecting line segments corresponding to adjacent top surfaces of the partition at different levels. The line segments corresponding to the top surfaces of the partition are drawn at "5% resolution", in which, for example, asperities having a length of 5 μm or less are disregarded with respect to a line segment having a length of 100 μm. This prevents the occurrence of too many line segments in the horizontal direction. In the drawing of the outermost contour of a partition, the presence of a trapping layer is disregarded. Subsequently, in the same manner as in the outermost contour of a partition, the outermost contour of the particle groups constituting a trapping layer is hypothetically drawn. The outermost contour of the particle groups is a line showing the outline of the trapping layer and refers to a projector obtained by irradiating a trapping layer surface (a surface to be irradiated; see the top in FIG. 2) with hypothetical parallel light in the direction perpendicular to the trapping layer surface (see the middle in FIG. 2). The outermost contour of the particle groups is composed of line segments corresponding to a plurality of top surfaces of the particle groups at different levels irradiated with hypothetical light and perpendicular lines each connecting line segments corresponding to adjacent top surfaces of the particle groups at different levels. The line segments corresponding to the top surfaces of the particle groups are drawn, for example, at the same "resolution" as in the partition. For a porous trapping layer, in a sample for observation prepared by embedding in a resin and polishing, some particle groups are observed as if they floated in the air. The outermost contour is therefore drawn with the projector obtained by hypothetical light irradiation. Subsequently, the standard reference line of the partition is determined on the basis of the levels and lengths of the line segments of the outermost contour corresponding to the top surfaces of the partition thus drawn. The standard reference line is the average line of the outermost contour of the partition (see the bottom in FIG. 2). In the same manner as in the standard reference line of the partition, the average level of the particle groups is determined on the basis of the levels and lengths of the line segments of the outermost contour corresponding to the top surfaces of the particle groups thus drawn. The average level of the particle groups is the average line of the outermost contour of the particle groups (see the bottom in FIG. 2). The difference (length) between the average level of the particle groups and the standard reference line of the partition is considered to be the thickness of the trapping layer (the thickness of the particle groups) in the image. In this manner, the thickness of a trapping layer can be determined.

As illustrated in FIG. 3, the upstream, midstream, and downstream regions of the honeycomb filter 20 refer to three regions of an upstream zone, a middle zone, and a downstream zone in the flow path direction of the honeycomb filter 20. For a rectangular honeycomb segment 21, the thickness of a trapping layer is determined by observing cross sections of the honeycomb segment 21 at intervals of 1 mm from the inlet end face of the honeycomb filter 20 in the exhaust gas flow direction to check for the presence of the trapping layer, measuring the thickness of the trapping layer in the cross sections at intervals of 10 mm in the exhaust gas flow direction from the position at which the formation of the trapping layer has been observed, and averaging the thicknesses thus measured. The length of the undeposited region of the cell is determined by observing a plurality of cross sections from the inlet end face of the honeycomb segment 21 in the exhaust gas flow direction to check for the absence of the trapping layer and finding a region having no trapping layer. The lengths of the plural undeposited regions are measured in the observed cross sections and are averaged to determine the length of the undeposited region for the honeycomb segment 21. The average length of the undeposited regions of the honeycomb segments 21 is considered to be the length of the undeposited region for the honeycomb filter 20. The average length of the undeposited region relative to the cell length is calculated to determine the undeposited region length percentage with respect to the cell length. More specifically, if there are three cells having a length of 10 cm and if the lengths of the undeposited regions of the cells are 2, 3, and 4 cm, the average length of the undeposited regions is $(2+3+4)/3=3$ cm, and the undeposited region length percentage is $(2+3+4)/(10\times3)\times100=30\%$. In the cross-sectional direction observed, the presence of the trapping layer is examined in the cells in a region between the center of gravity of the honeycomb segment 21 and the outermost cells to calculate the percentage of the cell area containing the trapping layer relative to the total cell area in the region.

The trapping layer 24 preferably has an average pore size of 0.2 μm or more and 10 μm or less and a porosity of 40% by volume or more and 95% by volume or less. The average size of particles constituting the trapping layer is preferably 0.5 μm or more and 15 μm or less. An average pore size of 0.2 μm or more results in the prevention of an excessive initial pressure loss in the absence of PM deposition. An average pore size of 10 μm or less results in an improvement in trapping efficiency, the prevention of PM entering the pore of the partition portion 22 through the trapping layer 24, and the prevention of the reduction in the effect of decreasing pressure loss during PM deposition. A porosity of 40% by volume or more results in the prevention of an excessive initial pressure loss in the absence of PM deposition. A porosity of 95% by volume or less results in the formation of a surface layer serving as a durable trapping layer 24. When the average size of particles constituting the trapping layer is 0.5 μm or more, a space between the particles constituting the trapping layer can be sufficiently provided, thus ensuring high permeability of the trapping layer and preventing a sudden increase in pressure loss. When the average size of particles constituting the trapping layer is 15 μm or less, there are a sufficient number of points of contact between the particles, ensuring a sufficient bond strength between the particles and a high peel strength of the trapping layer. Thus, it is possible to maintain high PM trapping efficiency, prevent a sudden increase in pressure loss immediately after the start of PM trapping, decrease pressure loss during PM deposition, and impart durability to the trapping layer. The trapping layer 24 may be formed on the partition portion 22 of each of the exhaust gas inlet and outlet cells. As illustrated in FIG. 1, preferably, the trapping layer 24 is formed on the partition portion 22 of the inlet cell and is not formed on the partition portion 22 of the outlet cell. This allows PM contained in a fluid to be efficiently removed with low pressure loss. Furthermore, this facilitates the manufacture of the honeycomb filter 20. The trapping layer 24 may contain one or more inorganic materials selected from cordierite, SiC, mullite, aluminum titanate, alumina, silicon nitride, sialon, zirconium phosphate, zirconia, titania, and silica. Preferably, the trapping layer 24 is formed of the material of the partition portion 22. More preferably, the trapping layer 24 contains 70% by weight or more ceramic or metallic inorganic fiber. The fiber facilitates PM trapping. The inorganic fiber of the trapping layer 24 may contain one or more materials selected from aluminosilicate, alumina, silica, zirconia, ceria, and mullite.

The average pore size and the porosity of the trapping layer 24 are determined by image analysis based on SEM observation. In the same manner as in the thickness of the trapping layer, as illustrated in FIG. 2, images of a cross section of the honeycomb filter 20 are obtained with SEM. A region between the outermost contour of a partition and the outermost contour of particle groups is considered to be a region occupied by a trapping layer (a trapping layer region). In the trapping layer region, a region including the particle groups is referred to as a "particle group region", and a region including no particle group is referred to as a "pore region of the trapping layer". The area of the trapping layer region (trapping layer area) and the area of the particle group region (particle group area) are determined. The porosity of the trapping layer is calculated by dividing the particle group area by the trapping layer area and multiplying the quotient by 100. In the "pore region of the trapping layer", an incircle inscribed in the outermost contours of the particle groups and the partition and the periphery of the particle groups is drawn so that the diameter of the incircle is as large as possible. In the case that a plurality of incircles can be drawn in one "pore region of the trapping layer", for example, in the case of a rectangular pore region having a large aspect ratio, a plurality of incircles as large as possible are drawn such that the pore region is sufficiently filled with the incircles. In the image observation area, the average diameter of the incircles is considered to be the average pore size of the trapping layer. In this manner, the average pore size and the porosity of the trapping layer 24 can be determined.

A method for forming the trapping layer 24 may involve supplying a gas containing the raw material for the trapping layer to an inlet cell using a gas (air) as a transport medium for the raw material for the trapping layer. This is preferred because the particle groups constituting the trapping layer become coarse and can form a trapping layer having a very high porosity. The raw material for the trapping layer may be inorganic fiber or inorganic particles. The inorganic fiber may be that described above and preferably has an average particle size of 0.5 μm or more and 8 μm or less and an average length of 100 μm or more and 500 μm or less. The inorganic particles may be particles made of the inorganic material described above. For example, SiC particles or cordierite particles having an average size of 0.5 μm or more and 15 μm or less can be used. In this case, the inorganic material of the partition portion 22 is preferably the same as the inorganic material of the trapping layer 24. In the formation of the trapping layer 24, in addition to inorganic fiber or inorganic particles, a binding material may be supplied. The binding material may be selected from sol materials and colloid materials and is preferably colloidal silica. Preferably, the inorganic particles are coated with silica, and the inorganic particles are bound to each other with silica, and the inorganic particles are bound to the material of the partition portion with silica. In the case of an oxide material, such as cordierite or aluminum titanate, the inorganic particles are preferably bound to each other by sintering, and the inorganic particles are preferably bound to the material of the partition portion by sintering. The trapping layer 24 is preferably bonded to the partition portion 22 by forming a layer of the raw material on the partition portion 22 and performing heat treatment. The heat treatment temperature is preferably 650° C. or more and 1350° C. or less. Heat treatment at a temperature of 650° C. or more can ensure a sufficient bonding strength. Heat treatment at a temperature of 1350° C. or less can prevent the blockage of pores caused by excessive oxidation of the particles. The trapping layer 24 may be formed on the cell 23 using a slurry containing inorganic particles serving as the raw material of the trapping layer 24.

In the formation of the trapping layer 24, a component that can block the gas flow may be contained in the partition portion 22 in the upstream region, and the raw material particles of the trapping layer 24 may be supplied to the cell 23 using a gas. The blocking component decreases the deposition of the raw material particles of the trapping layer 24 in the upstream region and thereby decreases the formation of the trapping layer 24 in the upstream region. Thus, the honeycomb filter 20 that has no trapping layer 24 in the upstream region can be easily formed using the blocking component. Preferably, the blocking component is an organic component that can be burnt in a subsequent heat-treatment process. The blocking component may be a resin. In this manner, the trapping layer 24 that has an undeposited region 32 in the upstream region can be formed.

The bonding layer 27 is a layer for joining the honeycomb segments 21 and may contain inorganic particles, inorganic fiber, and a binding material. The inorganic particles may be particles made of the inorganic material described above and preferably have an average size of 0.1 µm or more and 30 µm or less. The inorganic fiber may be that described above and preferably has an average particle size of 0.5 µm or more and 8 µm or less and an average length of 100 µm or more and 500 µm or less. The binding material may be colloidal silica or clay. The bonding layer 27 is preferably formed in the range of 0.5 mm or more and 2 mm or less. The average particle size is the median size (D50) measured with a laser diffraction/scattering particle size distribution analyzer using water as a dispersion medium. The outer protective portion 28 is a layer for protecting the periphery of the honeycomb filter 20 and may contain the inorganic particles, the inorganic fiber, and the binding material described above.

In the honeycomb filter 20, the thermal expansion coefficient of the cell 23 in the longitudinal direction at a temperature in the range of 40° C. to 800° C. is preferably $6.0 \times 10^{-6}/°$ C. or less, more preferably $1.0 \times 10^{-6}/°$ C. or less, still more preferably $0.8 \times 10^{-6}/°$ C. or less. At a thermal expansion coefficient of $6.0 \times 10^{-6}/°$ C. or less, thermal stress generated by exposure to a high-temperature exhaust gas can be within tolerance.

The honeycomb filter 20 may have any external shape and may be cylindrical, quadrangular prismatic, cylindroid, or hexagonal columnar. The honeycomb segments 21 may have any external shape, preferably have a plane that is easy to join, and may have a square columnar (quadrangular prismatic, hexagonal columnar, or the like) cross section. The cross section of the cell may be polygonal, such as triangular, tetragonal, hexagonal, or octagonal, circular, or streamlined, such as elliptical, or combination thereof. For example, the cell 23 may have a tetragonal cross section perpendicular to the exhaust gas flow direction.

The honeycomb filter 20 preferably has a cell pitch of 1.0 mm or more and 2.5 mm or less. The pressure loss during PM deposition decreases with increasing filtration area. The initial pressure loss increases with decreasing cell diameter. Thus, the cell pitch, the cell density, and the thickness of the partition portion 22 may be determined in consideration of trade-offs between initial pressure loss, pressure loss during PM deposition, and PM trapping efficiency.

In the honeycomb filter 20, the partition portion 22 or the trapping layer 24 may contain a catalyst. The catalyst may be at least one of catalysts for promoting the combustion of trapped PM, catalysts for oxidizing unburned gases (HCs, CO, and the like) contained in an exhaust gas, and catalysts for occluding/adsorbing/decomposing $NO_x$. The catalyst can increase the efficiency of removing PM, oxidizing unburned gases, or decomposing $NO_x$. The catalyst more preferably contains at least one of noble metal elements and transition metal elements. The honeycomb filter 20 may be loaded with another catalyst or a purification material. Among those are a $NO_x$ storage catalyst containing an alkali metal (such as Li, Na, K, or Cs) or an alkaline-earth metal (such as Ca, Ba, or Sr), at least one rare-earth metal, a transition metal, a three-way catalyst, a promoter exemplified by cerium (Ce) and/or zirconium (Zr) oxide, or a hydrocarbon (HC) adsorbent. More specifically, examples of the noble metal include platinum (Pt), palladium (Pd), rhodium (Rh), gold (Au), and silver (Ag). Examples of the transition metal contained in the catalyst include Mn, Fe, Co, Ni, Cu, Zn, Sc, Ti, V, and Cr. Examples of the rare-earth metal include Sm, Gd, Nd, Y, La, and Pr. Examples of the alkaline-earth metal include Mg, Ca, Sr, and Ba. Among these, platinum and palladium are more preferred. The noble metal, the transition metal, or the promoter may be supported by a carrier having a large specific surface area. Examples of the carrier include alumina, silica, silica alumina, and zeolite. The honeycomb filter 20 containing a catalyst for promoting PM combustion can more easily remove PM trapped on the trapping layer 24. The honeycomb filter 20 containing a catalyst for oxidizing unburned gases or a catalyst for decomposing $NO_x$ can more highly purify an exhaust gas.

In the honeycomb filter 20 according to the present embodiment, the undeposited region 32 having no trapping layer 24 in the upstream region of the partition portion 22 can decrease the permeation resistance of the partition portion in the upstream region and facilitate the passage of an exhaust gas through the partition portion 22 in the upstream region. This facilitates the propagation of heat in the partition portion in the upstream region to the downstream region, thus improving the temperature rise performance of the entire honeycomb filter 20. Thus, the regeneration treatment of trapped PM can be efficiently performed. In those having an oxidation catalyst, unburned gases in an exhaust gas can be more easily removed.

Figure 4:
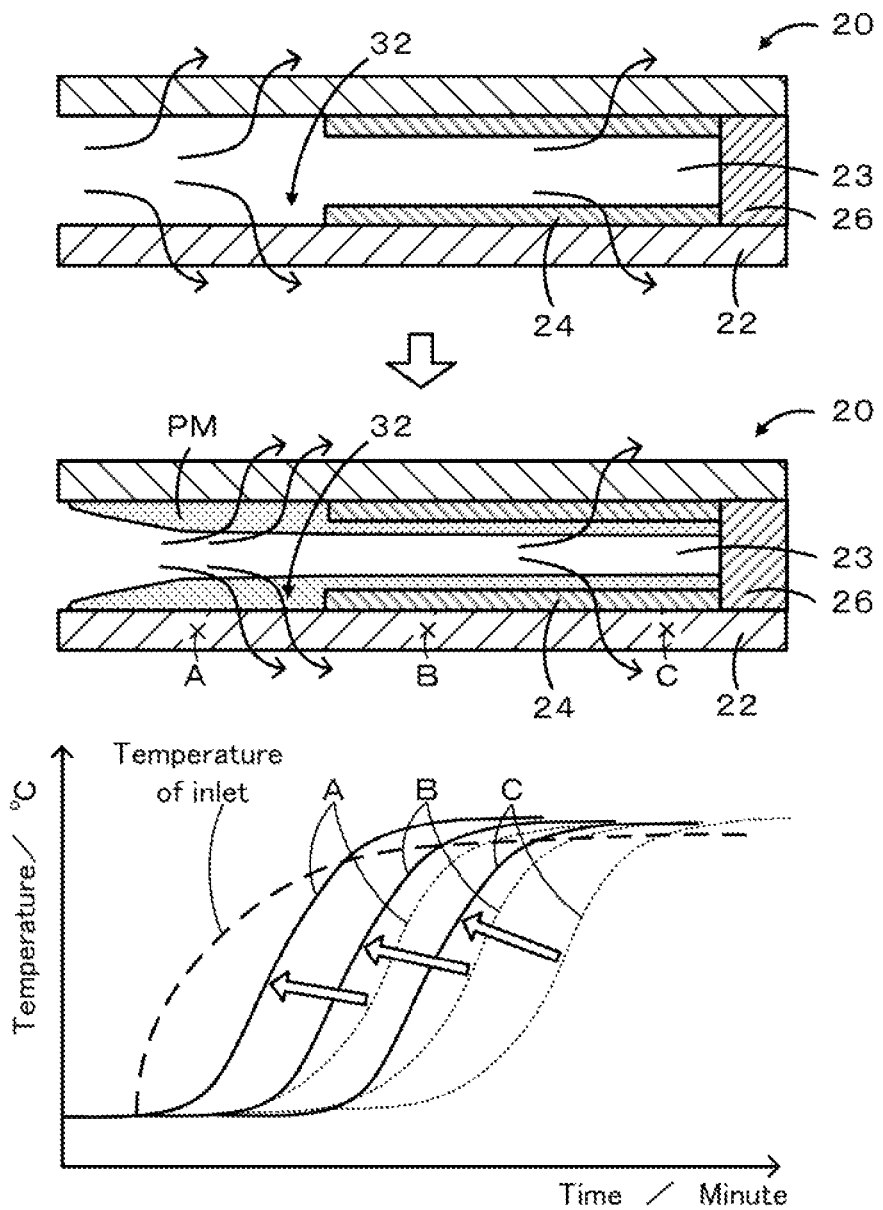
FIG. 4 shows conceptual diagrams of a honeycomb filter 20 during PM deposition and regeneration treatment.

A method for utilizing the honeycomb filter 20 will be described below. FIG. 4 shows conceptual diagrams of the honeycomb filter 20 during PM deposition and regeneration treatment. The top is an explanatory view of the cell 23 before PM deposition. The middle is an explanatory view of the cell 23 after PM deposition. The bottom shows a temperature change as a function of time at three points (A, B, and C) during PM regeneration treatment. In the bottom in FIG. 4, the temperature change in the absence of the undeposited region is indicated by a dotted line, and the temperature change in the presence of the undeposited region 32 is indicated by a solid line. For example, a diesel oxidation catalyst (DOC) is disposed directly under the engine, and a honeycomb filter (diesel particulate filter (DPF)) is disposed directly under the DOC. In this case, because of the limited space, the size of a DOC disposed upstream of a DPF is small. Considering the oxidation treatment of unburned gases (HC/CO), the function of oxidizing unburned gases may be required also for the DPF. The regeneration treatment for removing DPF-trapped PM by combustion can be performed by a combination of a method for increasing the temperature by fuel combustion in a combustion chamber by the engine combustion control and a method for generating heat by the oxidation of intentionally produced unburned gases with an oxidation catalyst coated on a DOC or DPF. Since existing DPFs in which a trapping layer is entirely and uniformly formed have a much larger heat capacity than DOCs, the DPFs have poor temperature rise performance. Thus, the coated catalyst is not activated initially, and unburned gases are sometimes insufficiently removed. In contrast, as illustrated in FIG. 4, the undeposited region in the upstream region of the honeycomb filter 20 according to the present embodiment decreases the permeation resistance of the partition portion in the upstream region, allowing a larger amount of PM to be deposited in the upstream region (see the middle in FIG. 4) and increasing the exhaust gas permeation rate. Thus, an increase in the amount of PM deposit in the upstream region during the regeneration treatment and an increase in exhaust gas permeation rate synergistically increase the temperature of the honeycomb filter 20 in an early stage (see the bottom in FIG. 4) and rapidly activate the catalyst applied to the honeycomb filter 20. Thus, the honeycomb filter 20 has improved capacity to remove unburned gases. It is generally believed that the average size of PM entering a DPF disposed under the floor ranges from approximately 200 to 250 nm. In accordance with a PM trapping mechanism, PM having a size in the range of approximately 200 to 300 nm is the most difficult to trap because of insufficient PM trapping by diffusion and screening. In the case of a DPF disposed directly under the engine, the aggregation of PM emitted from the engine is insufficient in a gas exhaust pipe, and the average size of PM passing through a DPF partition ranges from approximately 150 to 200 nm, which is smaller than the PM size in the DPF disposed under the floor. Thus, diffusion trapping functions well. Even with an increase in exhaust gas permeation rate in the upstream region having no trapping layer, PM can be trapped by the pores of the partition portion, achieving sufficiently high trapping efficiency in the DPF. In DPFs disposed not only directly under the engine but also under the floor, even when the PM aggregation rarely occurs and the average PM size is small because of improved engine performance, the honeycomb filter 20 having an undeposited region in the upstream region will be useful.

The present invention is not limited to the above-described embodiment. It is clear that the present invention can be implemented in a variety of embodiments without departing from the technical scope thereof.

Figure 5:
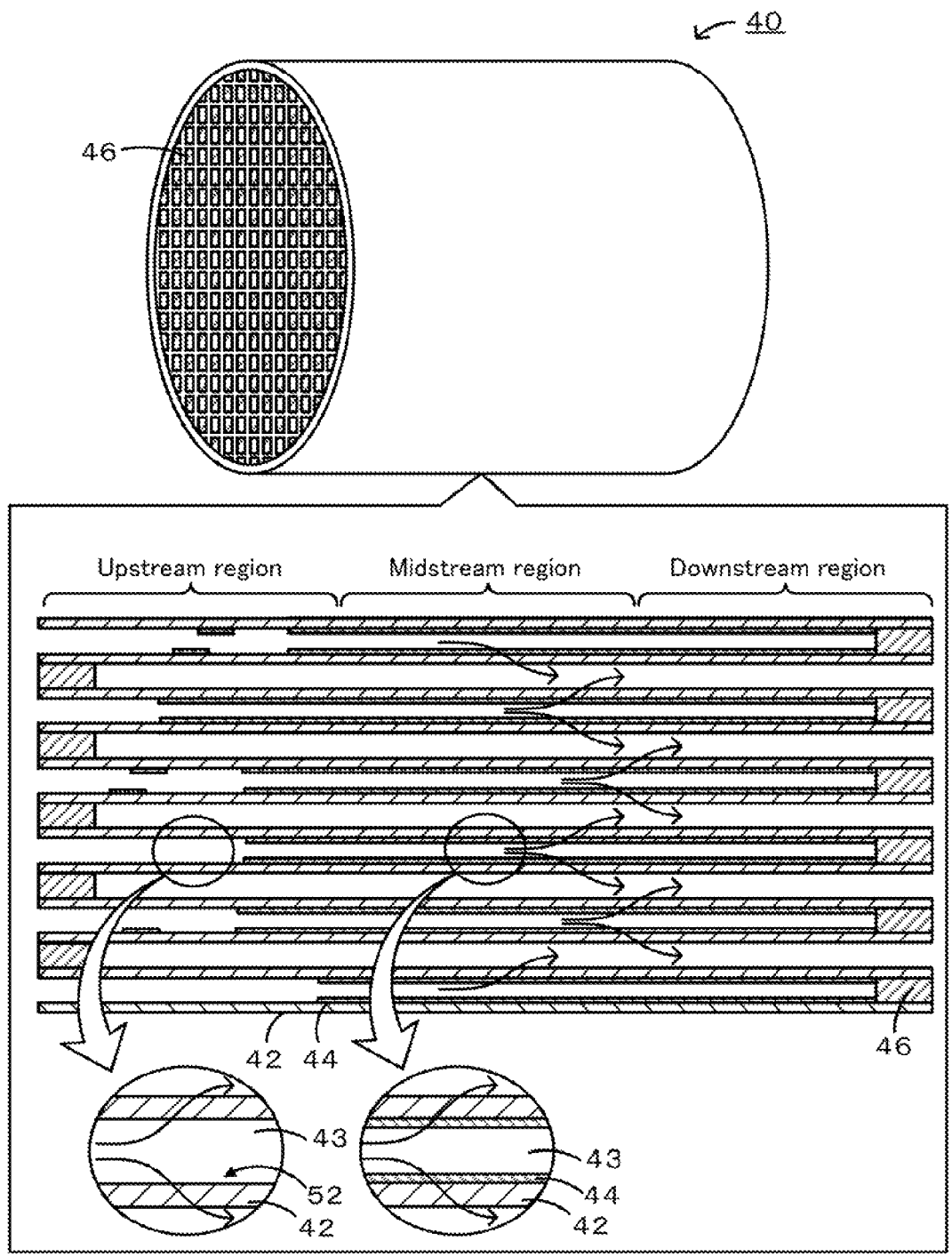
FIG. 5 is an explanatory view of the structure of a honeycomb filter 40.

Although the honeycomb segments 21 are joined together with the bonding layer 27 in the honeycomb filter 20 according to the present embodiment, an integrally molded honeycomb filter 40 as illustrated in FIG. 5 is also suitable. In the honeycomb filter 40, partition portions 42, cells 43, trapping layers 44, sealing portions 46, an outer protective portion 48, and undeposited regions 52 may have the same structure as the partition portions 22, the cells 23, the trapping layers 24, the sealing portions 26, the outer protective portion 28, and the undeposited regions 32 of the honeycomb filter 20, respectively. Also with the honeycomb filter 40, residual PM in the regeneration treatment can be decreased, and the regeneration treatment time of PM can be decreased.

Although the honeycomb filter 20 contains a catalyst in the present embodiment, any honeycomb filter that can filter out substances to be removed in a fluid is suitable. The honeycomb filter 20 may contain no catalyst. Although the honeycomb filter 20 can trap PM contained in an exhaust gas, any honeycomb filter that can trap and remove solid components contained in a fluid is suitable. Also suitable are honeycomb filters for use in engines of construction equipment and honeycomb filters for use in factories and power plants.

EXAMPLES

Specific examples of the manufacture of a honeycomb filter will be described below.

[Manufacture of Honeycomb Filter (DPF)]

A SiC powder and a metallic Si powder were mixed at a mass ratio of 80:20. Methylcellulose, hydroxypropoxylmethylcellulose, a surfactant, and water were added to the mixture, which was then kneaded to prepare a plastic pug. The pug was extruded through a die to form a honeycomb segment formed product having a desired shape. The honeycomb segment was formed such that the cell shape in a cross section perpendicular to the exhaust gas flow direction was tetragonal, the thickness of the partition portion was 300 µm, the cell pitch was 1.47 mm, the cross section was 35 mm×35 mm, and the length was 152 mm. The honeycomb segment formed product was dried using a microwave and then with hot air, was sealed, was calcined in an oxidizing atmosphere at 550° C. for three hours, and was baked in an inert atmosphere at 1400° C. for two hours. The sealing portions were formed by masking alternate cell openings of the segment formed product at one end face and immersing the masked end face in a sealing slurry containing a SiC raw material, thereby alternately forming openings and sealing portions. The other end face was then masked in the same manner. The sealing portions were formed such that a cell that is open at one end and closed at the other end and a cell that is closed at one end and open at the other end are alternately disposed. Air containing SiC particles having an average size smaller than the average pore size of the partition was introduced from open ends of the honeycomb segment fired product on the exhaust gas inlet side while drawn in by suction from the outlet side of the honeycomb segments. The SiC particles were deposited on the surface layer of the partition on the exhaust gas inlet side. A trapping layer was formed on the partition portion such that an undeposited region was formed in the upstream region of the partition portion by thickness distribution treatment described below. Heat treatment in the atmosphere at 1300° C. for two hours was performed to join the SiC particles deposited on the surface layer of the partition together and the deposited SiC particles and SiC and Si particles constituting the partition together. Thus, honeycomb segments were formed in which the trapping layer was formed on the partition portion. A binder slurry prepared by kneading alumina silicate fiber, colloidal silica, poly(vinyl alcohol), silicon carbide, and water was applied to a side surface of each of the honeycomb segments thus formed. The honeycomb segments were assembled and pressed against each other and were heat-dried to form a tetragonal honeycomb segment assembly. The honeycomb segment assembly was cylindrically ground. A coating slurry composed of the same materials as the binder slurry was then applied to the honeycomb segment assembly and was hardened by drying to manufacture a cylindrical honeycomb filter having a desired shape, segment shape, and cell structure. The honeycomb filter had a cross section diameter of 144 mm and a length of 152 mm. In Examples 1 to 14 and Comparative Examples 1 to 5 described below, the porosity of tee partition portion was 40% by volume, the average pore size was 15 µm, and the average size of particles forming the trapping layer was 2.0 µm. The porosity and the average pore size of the partition portion were measured with a mercury porosimeter (Auto Pore III 9405 manufactured by Micromeritics). The average size of the raw material particles of the trapping layer is the median size (D50) measured with a laser diffraction/scattering particle size distribution analyzer (LA-910 manufactured by Horiba, Ltd.) using water as a dispersion medium.

[Thickness Distribution Treatment of Trapping Layer]

A resin was applied to a predetermined area extending from the inlet end face of the honeycomb segment to fill the pores of the partition portion in the upstream region with the resin. A gas containing fine particles, which was the raw material for a trapping layer, was flowed through the inlet of the honeycomb segment to deposit the fine particles on the partition portion, forming the trapping layer. The honeycomb segment was then heat-treated to joining the fine particles deposited on the partition portion. Part of the resin applied to the upstream region was burnt in the heat treatment. Thus, the trapping layer having an undeposited region in the upstream region of the partition portion was formed on the partition portion.

[Catalyst Loading]

Raw materials of alumina:platinum:ceria-based material=7:0.5:2.5 based on the weight ratio in which the ceria-based material was Ce:Zr:Pr:Y:Mn=60:20:10:5:5 based on the weight ratio were mixed to prepare an aqueous catalyst slurry. The outlet end face (exhaust gas outlet side) of a honeycomb structure was immersed in the catalyst slurry up to a predetermined height. The catalyst slurry was drawn in by suction from the inlet end face (exhaust gas inlet side) at a predetermined suction pressure and suction flow rate for a predetermined time to allow the catalyst to be loaded on the partition, was dried at 120° C. for two hours, and was baked at 550° C. for one hour. The amount of catalyst per unit volume of honeycomb filter was 30 g/L.

[Thickness of Trapping Layer and Detection and Measurement of Undeposited Region by SEM Observation]

SEM images of cross sections of Examples 1 to 14 and Comparative Examples 1 to 6 were obtained with a scanning electron microscope (S-3200N manufactured by Hitachi High-Technologies Corp.) to measure the side trapping layer thickness X and the corner trapping layer thickness Y. First, a sample for observation was prepared by embedding a partition substrate of the honeycomb filter in a resin and cutting and polishing such that a cross section perpendicular to the fluid flow direction served as an observation surface. The observation surface of the sample for observation prepared was photographed at measuring points described below in a visual field of approximately 500 μm×500 μm at a SEM magnification in the range of 100 to 500. The thickness of a trapping layer was determined by observing cross sections of the honeycomb filter 20 at intervals of 1 mm from the inlet end face of the honeycomb filter 20 in the exhaust gas flow direction to check for the presence of the trapping layer, measuring the thickness of the trapping layer in the cross sections at intervals of 10 mm in the exhaust gas flow direction from the position at which the formation of the trapping layer has been observed, and averaging the thicknesses thus measured. The length of the undeposited region of the cell was determined by observing a plurality of cross sections from the inlet end face of the honeycomb segment 21 in the exhaust gas flow direction to check for the absence of the trapping layer and finding a region having no trapping layer. The lengths of the undeposited region were measured in the observed cross sections and were averaged to determine the length of the undeposited region for the honeycomb segment 21. The average length of the undeposited regions of the honeycomb segments 21 was considered to be the length of the undeposited region for the honeycomb filter 20. The average length of the undeposited region relative to the inlet cell length was calculated to determine the undeposited region length percentage with respect to the inlet cell length. In the cross-sectional direction observed, the presence of the trapping layer was examined in the inlet cells in a region between the center of gravity of the honeycomb segment 21 and the outermost inlet cells to calculate the percentage of the inlet cell area containing the trapping layer relative to the total inlet cell area in the region. The thickness of the trapping layer was determined in accordance with the following procedure. First, the outermost contour of the partition was hypothetically drawn on the image obtained. The outermost contour of the partition refers to a projector obtained by irradiating a partition surface with hypothetical light in the direction perpendicular to the partition surface. Likewise, the outermost contour of the particle groups constituting the trapping layer was hypothetically drawn. The outermost contour of the particle groups refers to a projector obtained by irradiating a surface of the particle groups with hypothetical light in the direction perpendicular to the trapping layer surface. Subsequently, the standard reference line of the partition was determined on the basis of the levels and lengths of the line segments of the outermost contour corresponding to the top surfaces of the partition thus drawn. The standard reference line is the average line of the outermost contour of the partition. In the same manner as in the standard reference line of the partition, the average level of the particle groups was determined on the basis of the levels and lengths of the line segments of the outermost contour corresponding to the top surfaces of the particle groups thus drawn. The average level of the particle groups is the average line of the outermost contour of the particle groups. The difference (length) between the average level of the particle groups and the standard reference line of the partition was considered to be the thickness of the trapping layer (the thickness of the particle groups) in the image.

[Manufacture of Diesel Oxidation Catalyst (DOC)]

Alumina (having an average particle size of 2.5 μm), kaolin (having an average particle size of 2.6 μm), talc (having an average particle size of 3 μm), and silica (having an average particle size of 3.6 μm) were used as cordierite raw materials. A hundred parts by weight of a cordierite raw material, 13 parts by weight of a pore-forming material, 35 parts by weight of a dispersion medium, 6 parts by weight of an organic binder, and 0.5 parts by weight of dispersant were mixed to prepare a pug. Water was used as the dispersion medium. Coke having an average particle size of 10 μm was used as the pore-forming material. Hydroxypropylmethylcellulose was used as the organic binder. Ethylene glycol was used as the dispersant. The pug was extruded through a predetermined die. The cell shape was tetragonal, the thickness of the partition portion was 102 μm, the cell pitch was 1.27 mm, the cross section was 144 mm in diameter, and the length was 60 mm. The formed product was dried in a microwave dryer, was completely dried in a hot-air dryer, and was baked at a temperature in the range of 1410° C. to 1440° C. for five hours to produce a honeycomb structure mainly composed of cordierite. This honeycomb structure was then coated with an alumina:platinum:ceria catalyst at an amount of catalyst per unit volume of 80 g/L.

Examples 1 to 6

In accordance with the conditions for manufacturing the honeycomb filter described above, a honeycomb segment was formed such that the thickness of the partition portion was 304.8 μm and the cell width was 1.16 μm square. The thickness distribution treatment of the trapping layer was performed such that the undeposited region length percentage was 5%, the undeposited region area percentage in a cross section was 100%, and the average thickness of the trapping layer was 40 μm. The resulting honeycomb filter was referred to as Example 1. Honeycomb filters manufactured in the same manner as in Example 1 except that the undeposited region length percentage was 10%, 15%, 20%, 25%, or 30% were referred to as Examples 2 to 6, respectively.

Comparative Examples 1 to 5

Honeycomb filters manufactured in the same manner as in Example 1 except that the undeposited region length percentage was 0%, 3%, 4%, 32%, or 35% were referred to as Comparative Examples 1 to 5, respectively.

Examples 7 to 14

The thickness distribution treatment of the trapping layer was performed under the same conditions for manufacturing the honeycomb filter described above except that the undeposited region length percentage was 15%, the average thickness of the trapping layer was 40 μm, and the undeposited region area percentage in a cross section was 6%, 8%, 10%, 15%, 20%, 30%, 50%, or 80%. The resulting honeycomb filters were referred to as Examples 7 to 14, respectively.

[Measurement of Purification Efficiency]

The DOC and the DPF manufactured as described above were subjected to aging. Simulating the mileage of approximately 200,000 km, the DOC and the DPF were subjected to aging in the atmosphere at 850° C. for 10 hours. After aging, the purification efficiency, the pressure loss due to PM deposition, and the PM trapping efficiency of the DOC and the DPF were measured. For the measurement of purification efficiency, 8 g/L of PM was deposited at 2500 rpm at 60 Nm on the DOC and the DPF disposed directly under a 2.2-L diesel engine. The DOC and the DPF were subjected to regeneration treatment by post-injection to remove PM deposit by combustion. The post-injection time was 10 minutes. During the regeneration treatment, HC/CO concentrations at positions in front of and behind the DPF were measured with MEXA-7000 manufactured by Horiba, Ltd. to determine purification efficiency. One minute after the start of regeneration treatment, all the samples had sufficiently high temperatures and purification capacity. Thus, performance within one minute after the start of regeneration treatment was compared.

[Measurement of Pressure Loss due to PM Deposition]

After 8 g/L of PM was deposited at 2500 rpm at 60 Nm in the measurement of purification efficiency described above, pressure loss immediately before regeneration treatment was measured for each sample as pressure loss due to PM deposition.

Experimental Results

Figure 6:
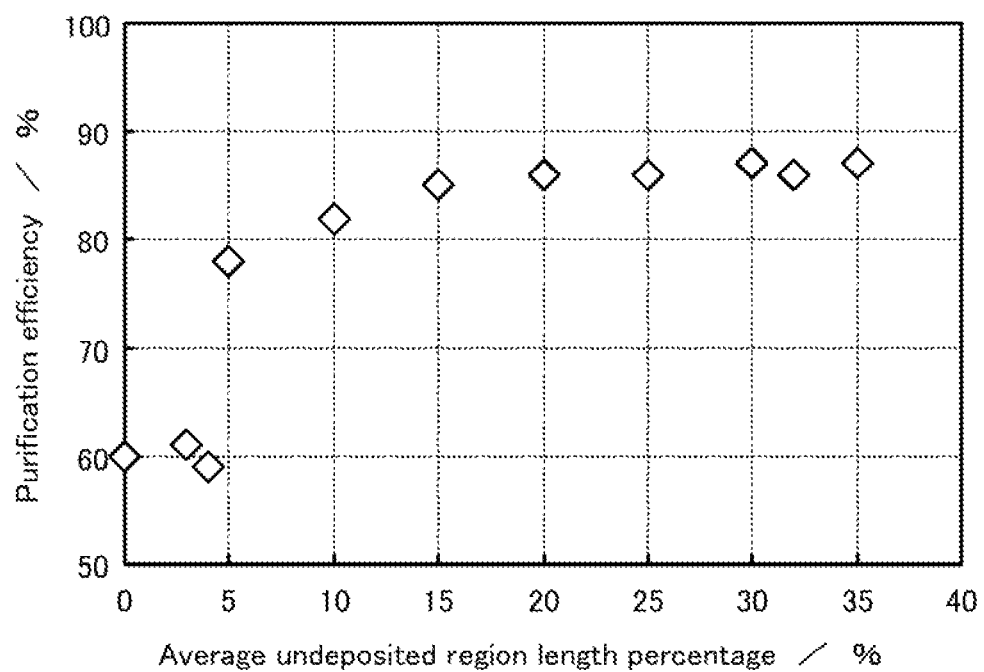
FIG. 6 is a graph showing the measurements of purification efficiency as a function of the undeposited region length percentage.
Figure 7:
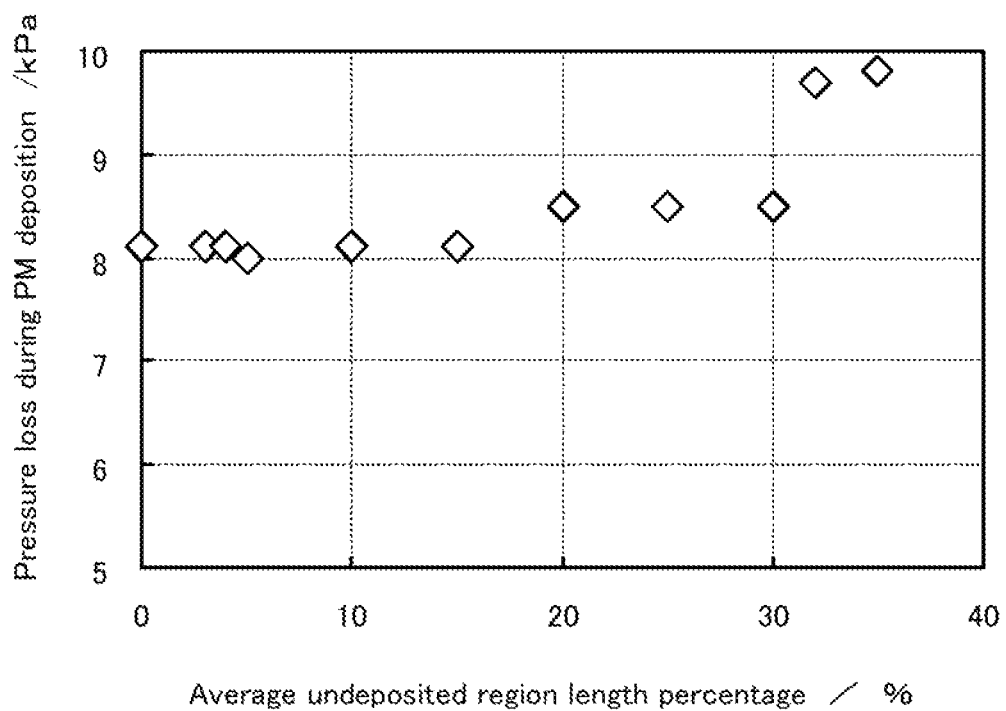
FIG. 7 is a graph showing the measurements of pressure loss during PM deposition as a function of the undeposited region length percentage.
Figure 8:
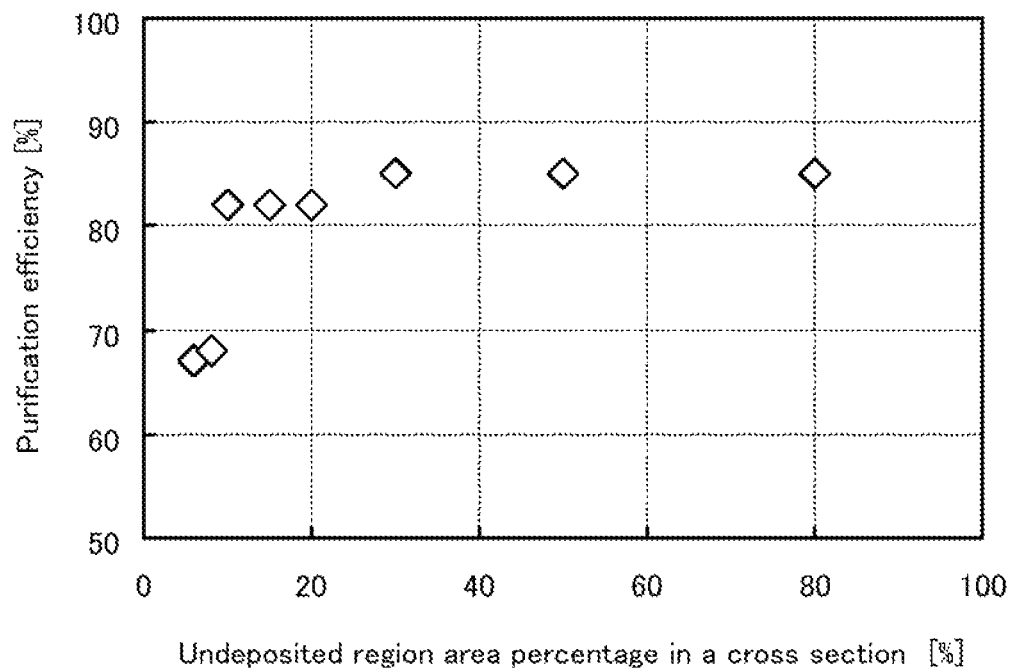
FIG. 8 is a graph showing the measurements of purification efficiency as a function of the undeposited region area percentage in a cross section.
Figure 9:
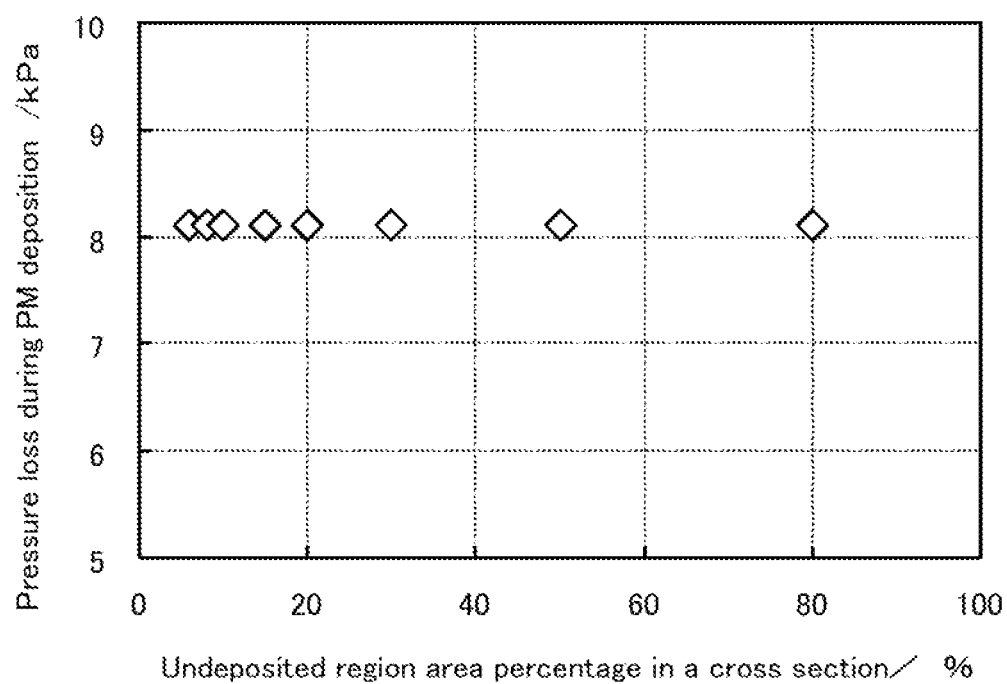
FIG. 9 is a graph showing the measurements of pressure loss during PM deposition as a function of the undeposited region area percentage in a cross section.

Table 1 summarizes the undeposited region length percentage (%), the undeposited region area percentage in a cross section (%), the average film thickness (μm), the HC/CO purification efficiency (%), and the pressure loss during PM deposition (kPa) for Examples 1 to 14 and Comparative Examples 1 to 5. FIG. 6 shows the measurements of purification efficiency as a function of the undeposited region length percentage for Examples 1 to 6 and Comparative Examples 1 to 5. FIG. 7 shows the measurements of pressure loss during PM deposition as a function of the undeposited region length percentage for Examples 1 to 6 and Comparative Examples 1 to 5. FIG. 8 shows the measurements of purification efficiency as a function of the undeposited region area percentage in a cross section for Examples 7 to 14. FIG. 9 shows the measurements of pressure loss during PM deposition as a function of the undeposited region area percentage in a cross section for Examples 7 to 14. Table 1 and FIG. 6 show that the purification efficiency was improved when the undeposited region length percentage was 5% or more. This is probably because the presence of at least a predetermined area of an undeposited region in the upstream region improves the temperature rise performance of the honeycomb filter 20 and thereby improves the purification efficiency. Table 1 and FIG. 7 show that the pressure loss during PM deposition was decreased when the undeposited region length percentage was 30% or less. This is probably because the presence of at least a predetermined area produces a remarkable effect of the trapping layer in the prevention of an increase in pressure loss. Thus, it is shown that the undeposited region length percentage is preferably 5% or more and 30% or less. Table 1 and FIG. 8 show that the purification efficiency was improved when the undeposited region area percentage in a cross section was 10% or more. This is probably because the presence of at least a predetermined area of an undeposited region in the upstream region improves the temperature rise performance of the honeycomb filter 20 and thereby improves the purification efficiency. Table 1 and FIG. 9 show that the pressure loss during PM deposition was independent of the undeposited region area percentage in a cross section.

TABLE 1

| Sample | Average undeposited region length percentage % | Undeposited region area percentage in cross section % | Average film thickness μm | Purification efficiency % | Pressure loss during PM deposition KPa |
| --- | --- | --- | --- | --- | --- |
| Comparative Example 1 | 0 | 0 | 40 | 60 | 8.1 |
| Comparative Example 2 | 3 | 100 | 40 | 61 | 8.1 |
| Comparative Example 3 | 4 | 100 | 40 | 59 | 8.1 |
| Example 1 | 5 | 100 | 40 | 78 | 8.0 |
| Example 2 | 10 | 100 | 40 | 82 | 8.1 |
| Example 3 | 15 | 100 | 40 | 85 | 8.1 |
| Example 4 | 20 | 100 | 40 | 86 | 8.5 |
| Example 5 | 25 | 100 | 40 | 86 | 8.5 |
| Example 6 | 30 | 100 | 40 | 87 | 8.5 |
| Comparative Example 4 | 32 | 100 | 40 | 86 | 9.7 |
| Comparative Example 5 | 35 | 100 | 40 | 87 | 9.8 |
| Example 7 | 15 | 6 | 40 | 67 | 8.1 |

TABLE 1-continued

| Sample | Average undeposited region length percentage % | Undeposited region area percentage in cross section % | Average film thickness μm | Purification efficiency % | Pressure loss during PM deposition KPa |
|---|---|---|---|---|---|
| Example 8 | 15 | 8 | 40 | 68 | 8.1 |
| Example 9 | 15 | 10 | 40 | 82 | 8.1 |
| Example 10 | 15 | 15 | 40 | 82 | 8.1 |
| Example 11 | 15 | 20 | 40 | 82 | 8.1 |
| Example 12 | 15 | 30 | 40 | 85 | 8.1 |
| Example 13 | 15 | 50 | 40 | 85 | 8.1 |
| Example 14 | 15 | 80 | 40 | 85 | 8.1 |

The present application claims priority from Japanese Patent Application No. 2010-81900 filed on Mar. 31, 2010, the entire contents of which are incorporated in the present specification by reference.

INDUSTRIAL APPLICABILITY

The present invention can suitably be applied to filters for purifying exhaust gases emitted from automobile engines, stationary engines for construction equipment, industrial stationary engines, and combustion equipment.

The invention claimed is:

1. A honeycomb filter for trapping and removing solid components contained in a fluid, the honeycomb filter comprising:
    a plurality of porous partition portions each forming a cell, the cell being open at one end and closed at the other end and serving as a flow path of the fluid; and
    a trapping layer for trapping and removing the solid components contained in the fluid, the trapping layer being disposed on each of the partition portions and containing particle groups having an average particle size smaller than the average pore size of the partition portions,
    wherein an upstream region of each of the partition portions includes an undeposited region having no trapping layer, the undeposited region having a length of 5% or more and 30% or less of the length of an inlet cell, which is the cell on the inlet side, and
    wherein the undeposited region in the upstream region of each of the partition portions has an area of 10% or more of the area of the cell in a cross section perpendicular to a flow direction of the fluid.

2. The honeycomb filter according to claim 1, wherein the trapping layer is formed by supplying an inorganic material that is a raw material for the trapping layer to the cell using a gas as a transport medium.

3. The honeycomb filter according to claim 1, wherein the partition portions contain one or more inorganic materials selected from cordierite, SiC, mullite, aluminum titanate, alumina, silicon nitride, sialon, zirconium phosphate, zirconia, titania, and silica.

4. The honeycomb filter according to claim 1, wherein the trapping layer contains one or more inorganic materials selected from cordierite, SiC, mullite, aluminum titanate, alumina, silicon nitride, sialon, zirconium phosphate, zirconia, titania, and silica.

5. The honeycomb filter according to claim 1, wherein the honeycomb filter is formed by joining two or more honeycomb segments with a bonding layer, each of the honeycomb segments having the partition portion and the trapping layer.

6. The honeycomb filter according to claim 1, wherein the partition portions, the trapping layers, or the partition portions and the trapping layers are loaded with a catalyst.

* * * * *